US009863734B2

(12) United States Patent
Matthews

(10) Patent No.: US 9,863,734 B2
(45) Date of Patent: Jan. 9, 2018

(54) SHOOTING REST ADJUSTING DEVICE

(71) Applicant: Ralph Matthews, Durham, NC (US)

(72) Inventor: Ralph Matthews, Durham, NC (US)

(*) Notice: Subject to any disclaimer, the term of this patent is extended or adjusted under 35 U.S.C. 154(b) by 0 days.

(21) Appl. No.: 15/407,551

(22) Filed: Jan. 17, 2017

(65) Prior Publication Data
US 2017/0211904 A1  Jul. 27, 2017

Related U.S. Application Data

(60) Provisional application No. 62/286,519, filed on Jan. 25, 2016.

(51) Int. Cl.
*F41A 9/62* (2006.01)
*F41A 23/02* (2006.01)
*A01M 31/02* (2006.01)

(52) U.S. Cl.
CPC .............. *F41A 23/02* (2013.01); *A01M 31/02* (2013.01)

(58) Field of Classification Search
CPC ..... A01M 31/02; A01M 31/025; F41A 23/00; F41A 23/02; F41A 23/16
See application file for complete search history.

(56) References Cited

U.S. PATENT DOCUMENTS

| | | | | |
|---|---|---|---|---|
| 2,795,045 A * | 6/1957 | Taylor | ...................... | A01G 3/06 30/314 |
| 3,097,822 A * | 7/1963 | Attwood | .............. | A47B 57/045 248/250 |
| 3,331,579 A * | 7/1967 | Petersen | ................. | E04G 13/06 249/14 |
| 4,065,088 A * | 12/1977 | Shell | .................... | A47B 57/045 248/242 |
| 4,218,788 A * | 8/1980 | Steckmesser | .......... | A61G 7/015 297/377 |
| 5,052,516 A * | 10/1991 | Jamieson | .............. | A01M 31/02 108/152 |
| 5,279,390 A * | 1/1994 | Phillips | ................. | A01M 31/02 182/116 |
| 5,538,101 A * | 7/1996 | Kempf | .................. | A01M 31/02 182/116 |
| 6,386,321 B1 * | 5/2002 | Muhich | ................. | A01M 31/02 182/135 |

(Continued)

FOREIGN PATENT DOCUMENTS

GB          900482 A  *  7/1962  ............. A01D 27/02

*Primary Examiner* — Gabriel J. Klein
(74) *Attorney, Agent, or Firm* — Global Intellectual Property Agency, LLC; Jordan Sworen

(57) ABSTRACT

A device for adjusting the level of a shooting rest. The device includes a triangle-shaped insert having a sloped first side that can receive the shooting rest thereon. A second side of the insert includes a plurality of slots that extend along the length of the insert, toward the first side. Each slot corresponds to a different level in which the shooting rest can be adjusted to when the insert is engaged therewith. An aperture on the insert receives a cord, wherein the cord can form a loop around the shooting rest for securing the insert thereto. The device is used with an existing tree stand or, in some embodiments, includes a tree stand. The insert receives the shooting rest against the first side thereof and the second side further secures to the tree stand, thereby providing adjustability of the insert for repositioning the level of the shooting rest.

11 Claims, 3 Drawing Sheets

(56) References Cited

U.S. PATENT DOCUMENTS

| | | | |
|---|---|---|---|
| 6,694,661 | B1 | 2/2004 | Langford |
| 7,958,663 | B2 | 6/2011 | Saunders |
| 8,683,909 | B1 | 4/2014 | Copus |
| 2002/0088163 | A1 | 7/2002 | Young et al. |
| 2004/0216351 | A1 | 11/2004 | Eppard et al. |
| 2005/0246935 | A1 | 11/2005 | Northrup |
| 2015/0053503 | A1* | 2/2015 | Richey .................. A01M 31/02 182/187 |

\* cited by examiner

SHOOTING REST ADJUSTING DEVICE

CROSS REFERENCE TO RELATED APPLICATION

This application claims the benefit of U.S. Provisional Application No. 62/286,519 filed on Jan. 25, 2016. The above identified patent application is herein incorporated by reference in its entirety to provide continuity of disclosure.

BACKGROUND OF THE INVENTION

The present invention relates to adjustable shooting rests. More specifically, the present invention provides a device for adjusting the level of a shooting rest on a tree stand.

Conventional tree stands include a shooting rest for positioning the end of a firearm or bow thereon. The shooting rest aids a hunter when maintaining the position of his or her firearm to prevent muscle fatigue. Shooting rests can typically only be placed in two positions; a first position for allowing the hunter to enter the tree stand and a second position for resting the firearm thereon. However, tree stands do not include a device or feature for allowing the level or height of the shooting rest to be adjusted. Thus, it may be difficult for a hunter to find a suitable position at which to set up his or her bow or firearm when hunting certain game from a tree stand.

Furthermore, conditions often change during hunting, such as the wind direction, the distance of the animal from the tree stand, and the speed of the animal, among other variables. As a result, the hunter may be required to adjust the height of the firearm to optimize his shooting position. However, if a hunter is unable to adjust the shooting rest, they will have to hold the firearm at a level at which they feel is optimal. However, holding the firearm for a period of time is tiring, thereby leading to a less precise or inaccurate shot. Therefore, there is a need for a shooting rest adjusting device that is mountable to a tree stand and allows for the level of the shooting rest of the tree stand to be adjusted.

SUMMARY OF THE INVENTION

In view of the foregoing disadvantages inherent in the known types of shooting rest adjusting devices now present in the prior art, the present invention provides a new shooting rest adjusting device wherein the same can be utilized for providing convenience for the user when adjusting the position or level of a shooting rest on a tree stand.

It is therefore an object of the present invention to provide a new and improved shooting rest adjusting device that has all of the advantages of the prior art and none of the disadvantages. The device includes a triangle-shaped insert having a sloped first side that can receive the shooting rest thereon. A second side of the insert includes a plurality of slots that extend along the length of the insert, toward the first side. Each slot corresponds to a different level in which the shooting rest can be adjusted to when the insert is engaged therewith. An aperture on the insert receives a cord, wherein the cord can form a loop around the shooting rest for securing the insert thereto. The device is used with an existing tree stand or, in some embodiments, includes a tree stand. The insert receives the shooting rest against the first side thereof and the second side further secures to the tree stand, thereby providing adjustability of the insert for repositioning the level of the shooting rest.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
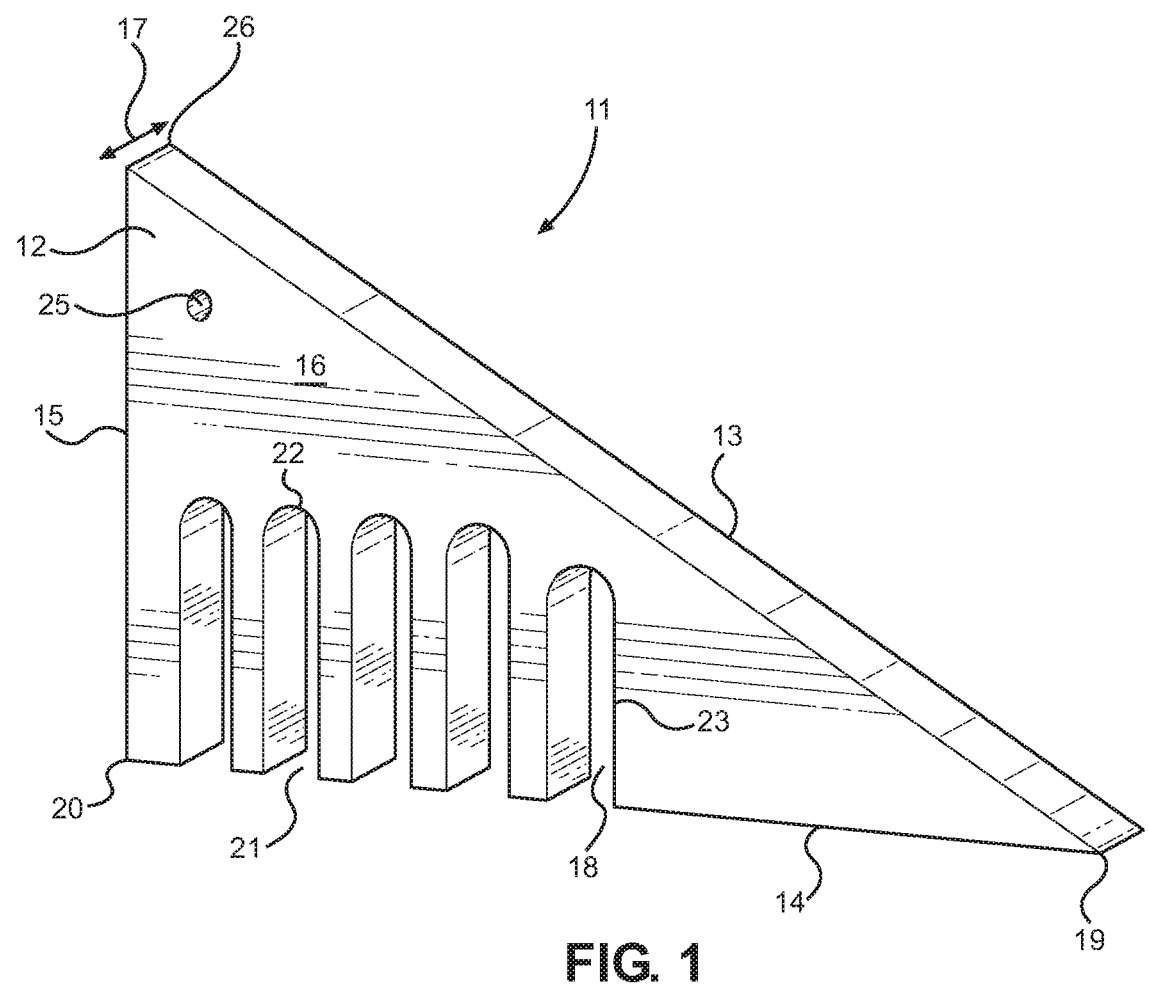
FIG. 1 shows a perspective view of the insert of the shooting rest adjusting device.

Reference is made herein to the attached drawings. Like reference numerals are used throughout the drawings to depict like or similar elements of the shooting rest adjusting device. For the purposes of presenting a brief and clear description of the present invention, the preferred embodiment will be discussed as used for adjusting the position of a shooting rest on a tree stand. The figures are intended for representative purposes only and should not be considered to be limiting in any respect.

Referring now to FIG. 1, there is shown a perspective view of the insert of the shooting rest adjusting device. The shooting rest adjusting device 11 comprises an insert 12 adapted to be positioned on an underside of a shooting rest of a tree stand so as to allow the level of the shooting rest to be adjusted. In the illustrated embodiment, the insert 12 comprises a triangle shape and is composed of a durable material, such as hard plastic or metal. In the illustrated embodiment, a front surface 16 and rear surface of the insert 12 are planar so as to prevent obstruction of the insert 12 with a firearm and portions of the tree stand when the insert 12 is being repositioned. In some embodiments, a width 17 of the insert 12 is no larger than ¾ths of an inch so as to correspond to the width of shooting rest.

A first side 13 of the triangle-shaped insert 12 is sloped so as to receive a shooting rest that is positioned for use thereon. The angle of the slope is between 5 and 85 degrees relative to a second side 14 of the insert 12. In the illustrated embodiment, the first side 13 is linear and planar so as to prevent the insert 12 from snagging on the shooting rest. The second side 14 of the insert 12 includes a plurality of slots 18 disposed along the length of the insert 12, wherein the length is measured from a first corner 19 to a second corner 20 thereof. An open end 21 of each slot 18 aligns with the second side 14 of the insert 12, whereas an opposing closed end 22 of the slot 18 is disposed toward the first side 13 thereof.

In the illustrated embodiment, the device 11 comprises five slots 18. Each slot 18 corresponds to a different level in which the shooting rest can be adjusted to when the insert 12 is engaged therewith. The slots 18 are parallel to one another. A first slot 23 is disposed towards the first corner 19 of the insert 12. In the depicted embodiment, the height of the first slot 23 is smaller than the height of at least one additional slot 18. In one embodiment, the height of the first slot 23 is no larger than two inches. The height is measured from the second side 14 to the first side 13. In the illustrated embodiment, the width of each of the slots 18, 23 are $\frac{5}{16}$ths of an inch. In the shown embodiment, the slots 18 are spaced at between 0.2 inches and 2 inches, wherein the spacing between adjacent slots 18 is consistent throughout the device 11.

The device 11 further comprises a fastener that enables the insert 12 to attach to a tree stand. In the illustrated embodiment, the fastener comprises an aperture 25 extending through the insert 12 and a cord 24 (See FIGS. 3 and 4) threaded through the aperture 25. In the illustrated embodiment, the aperture 25 is positioned on a third corner 26 of the insert 12. The fastener prevents the insert 12 from falling from the tree stand while a user is adjusting the level of the shooting rest. The cord is adapted to form a loop around the shooting rest for securing the insert 12 thereto. In some embodiments, the cord secures directly to the shooting rest of the tree stand.

Figure 2:
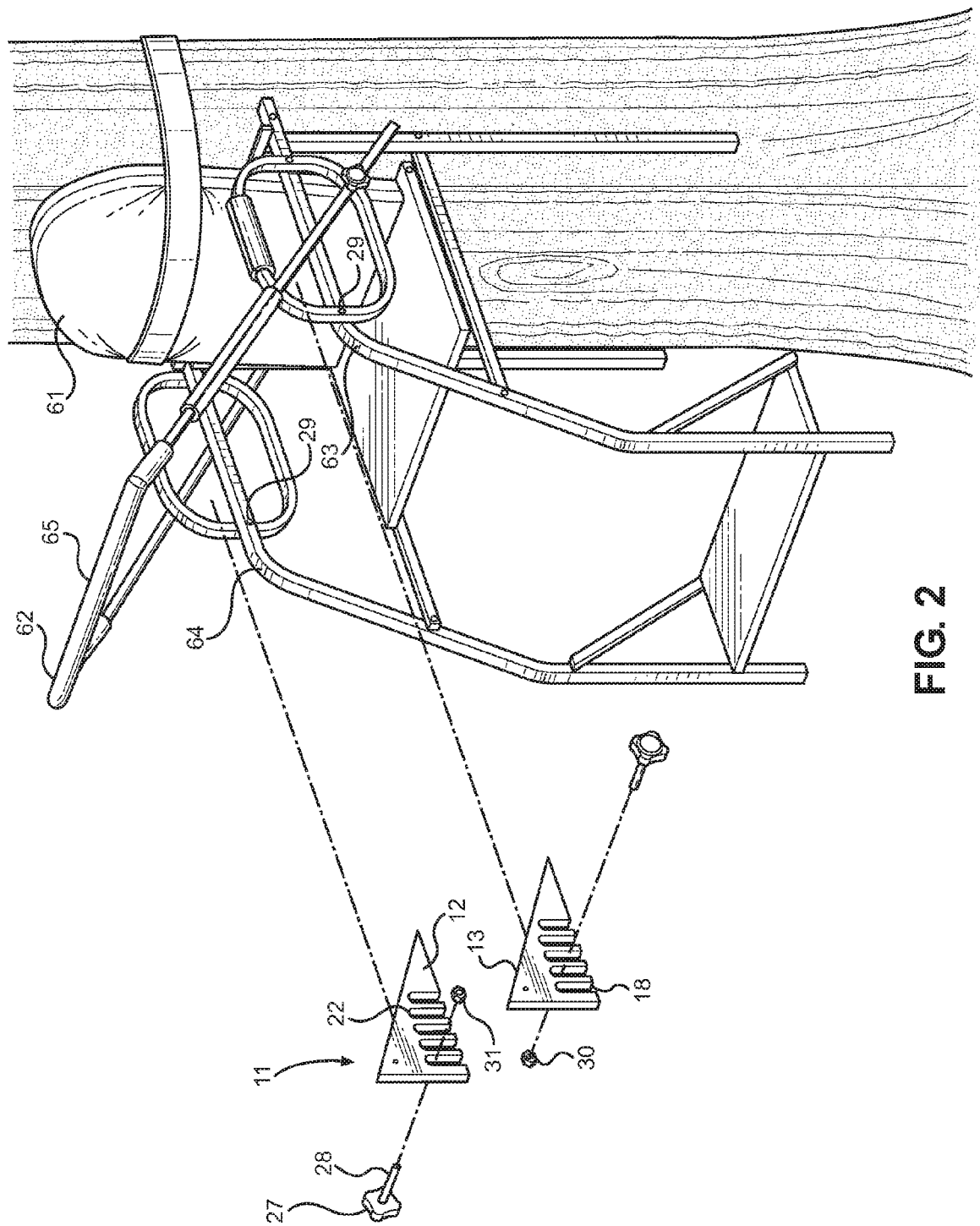
FIG. 2 shows an exploded view of the shooting rest adjusting device.

Referring now to FIG. 2, there is shown an exploded view of the shooting rest adjusting device. The shooting rest adjusting device 11 further comprises a securing mechanism in order to prevent the insert 12 from moving when secured to the shooting rest 62 via the fastener. In the illustrated embodiment, the securing mechanism comprises a knob 27 and a bolt 28 extending from the knob 27. The bolt 28 is adapted to fit through each of the slots 18, whereas the knob 27 is unable to fit through each slot 18 in order to prevent the bolt 28 from passing completely through a slot 18. The knob 27 comprises a dimension larger than the width of the slot 18.

Once the insert 12 is in a desired position, such that the first side 13 receives the shooting rest 62 and a slot 18 is aligned with an aperture 29 of the tree stand 61, the bolt 28 is inserted through the slot 18 and into the aperture 29. A nut 30 is secured to the distal end 31 of the bolt 28 in order to prevent the bolt 28 from being removed when the bolt 28 is positioned through the slot 18 and aperture 29. In the illustrated embodiment, the bolt 28 comprises a circular shaped cross section and each of the closed ends 22 of the slots 18 are arcuate in order to correspond to the shape of the bolt 28.

Figure 3:
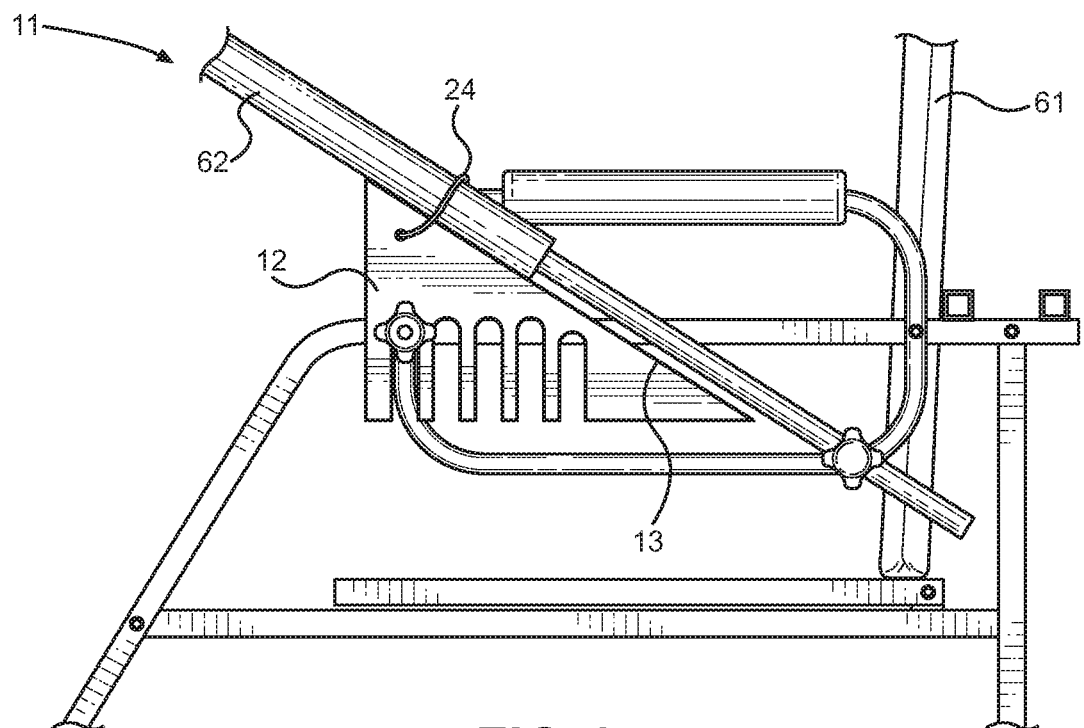
FIG. 3 shows a side view of the shooting rest adjusting device in use.
Figure 4:
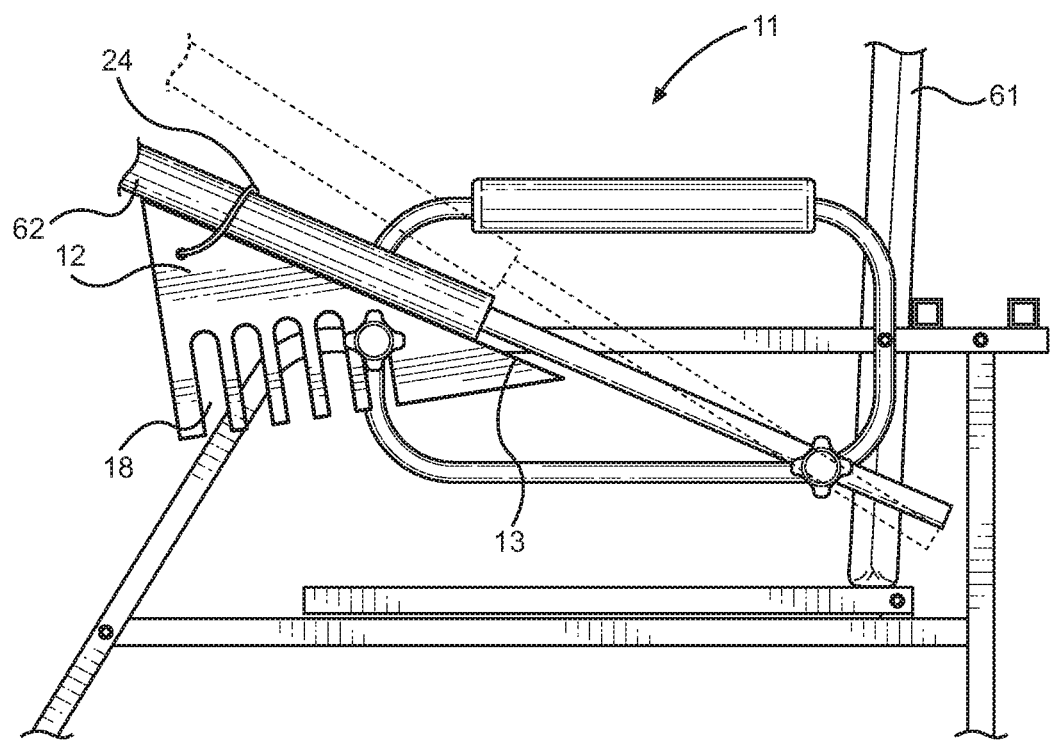
FIG. 4 shows another side view of the shooting rest adjusting device in use.

Referring now to FIGS. 3 and 4, there are shown side views of the shooting rest adjusting device in use. The device 11 is used with an existing tree stand 61 or, in some embodiments, includes a tree stand 61. The tree stand 61 comprises an adjustable shooting rest 62 pivotally secured thereto, wherein a first insert 12 is positioned on a first side 63 of the tree stand 61 and a second insert 12 is positioned on a second side 64 of the tree stand 61 for maintaining the shooting rest 61 at a level position (See FIG. 2). In operation, the tree stand 61 is secured to a vertical support, such as a tree, wherein the tree stand 61 includes a shooting rest 62 pivotally secured thereto. An insert 12 is positioned beneath each lateral side 63, 64 of the shooting rest 62 such that the first corner 19 of the insert 12 is nearest to a pivot point of the shooting rest 62 attached to the tree stand 61. The insert 12 is moved along a plane of the lateral side of the shooting rest 62 until the height of the crossbar 65 of the shooting rest 62 (See FIG. 2) is at a proper shooting level for a user. The bolt of the securing mechanism is positioned through a slot 18 disposed on the insert 12. At least a portion of the underside of the shooting rest 62 is positioned against the sloped first side 13 of the insert 12. The bolt frictionally fits through each slot 18 so as to maintain a static position, such that the second side of the insert is parallel to the ground.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shooting rest adjusting device, comprising:
   an insert including a first side, wherein the first side is sloped relative to a second side and the first side is adapted to receive a shooting rest thereon;
   a plurality of slots disposed along the second side of the insert and extending toward the first side, wherein each slot of the plurality of slots has an open end and a closed end;
   a fastener disposed on the insert and adapted to fasten the insert to a tree stand, wherein the fastener comprises an aperture disposed on the insert, a cord extending through the aperture, wherein the cord is configured to form a loop around the shooting rest; and
   a securing mechanism comprising a bolt extending from a knob, wherein the bolt is adapted to fit through each of the plurality of slots and the knob is unable to fit through each of the plurality of slots.

2. The shooting rest adjusting device of claim 1, wherein the insert comprises a triangle shape.

3. The shooting rest adjusting device of claim 1, wherein a height of a first slot of the plurality of slots is smaller than a height of a second slot of the plurality of slots.

4. The shooting rest adjusting device of claim 3, wherein the height of the first slot is at most two inches.

5. The shooting rest adjusting device of claim 1, wherein a width of each slot of the plurality of slots is 5/16ths of an inch.

6. The shooting rest adjusting device of claim 1, wherein a width of the insert is 3/4ths of an inch.

7. The shooting rest adjusting device of claim 1, wherein the closed end of each slot of the plurality of slots is arcuate.

8. The shooting rest adjusting device of claim 1, wherein an angle of the first side is between 5 degrees and 85 degrees relative to the second side.

9. The shooting rest adjusting device of claim 1, further comprising a tree stand having an adjustable shooting rest pivotally secured thereto, wherein a first insert is positioned on a first side of the tree stand and a second insert is positioned on a second side of the tree stand for maintaining the shooting rest at a level position.

10. The shooting rest adjusting device of claim 1, wherein the first side is linear and planar.

11. A method of using a shooting rest adjusting device, comprising:
    securing a tree stand to a vertical support, wherein the tree stand includes a shooting rest pivotally secured thereto;
    positioning a sloped side of each insert of a pair of inserts beneath each of a pair of lateral sides of the shooting rest such that a second corner of each insert is nearest to a pivot point of the shooting rest attached to the tree stand;

moving each insert along a plane of a respective lateral side of the shooting rest until the height of the shooting rest is at a desired shooting level for a user;

for each insert, placing a bolt of a securing mechanism through a slot disposed on each insert and fastening the bolt in position;

resting the shooting rest against the sloped side of each insert.

\* \* \* \* \*